United States Patent Office 3,154,525
Patented Oct. 27, 1964

3,154,525
PERHALOGENATED KETONES AS ACTIVATORS FOR THE ANIONIC POLYMERIZATION OF CAPROLACTAM
Melvin Ira Kohan, Wilmington, Del., assignor to E. I. du Pont de Nemours and Company, Wilmington, Del., a corporation of Delaware
No Drawing. Filed July 31, 1961, Ser. No. 127,908
12 Claims. (Cl. 260—78)

This invention relates to an improved process for the anionic polymerization of lactams. More particularly, it relates to a process for the rapid anionic polymerization of caprolactam wherein new co-catalysts and synergistically effective co-catalyst combinations are used to achieve high polymerization rates and fast polymer set-up times at temperatures well below the polyamide melting point.

Polymerization of ε-caprolactam to the polycarboxamide, 6-nylon, has been known for several decades. Early caprolactam polymerizations were catalyzed by acidic catalysts and small amounts of water and required long polymerization times, i.e., of the order of hours or even days. Later, the polymerization of caprolactam in the anhydrous state was found to occur relatively more rapidly when basic materials, particularly the alkali and alkaline-earth metals and their compounds, were present. These base-catalyzed or anionic polymerizations require temperatures above 200° C. Since these applied temperatures approach or even exceed the polyamide melting point and since the polymerization reaction is moderately exothermic, liquid (molten) polyamide is present during at least part of the anionic polymerization.

Exceeding the melting point of the polycaprolactam during the polymerization has several disadvantages, particularly when the caprolactam is to be polymerized in situ as a shaped article, coating, or the like. For example, in utilizing the high-temperature anionic polymerization procedures in casting or molding operations, the molds must be cooled appreciably before the molten or semimolten article solidifies and can safely be removed. Thus molding and casting cycles of economically unattractive lengths are required. In addition, the high peak temperatures and the wide temperature ranges through which the shaped articles or coatings are cycled often lead to shrinkage voids and other faults in the finished, cooled polymer.

Primarily because of these and other disadvantages inherent in the anionic polymerization of caprolactam, a variety of co-catalysts derived from organic and inorganic acids have been evaluated in the polymerization in recent years. However, to promote truly fast anionic polymerizations, i.e., to give solid polymer within the order of a few minutes, a number of the co-catalysts tried heretofore also have been used at temperatures above the polyamide melting point. Other co-catalyst candidates have not been found effective in low concentration, a factor which can affect both process economics and polymer quality. Hence, the need for new, improved co-catalysts for the anionic polymerization of caprolactam has continued.

In accord with the present invention, I have found that use of a small amount of a new class of co-catalysts, halogenated ketones, in the anionic polymerization of caprolactam promotes rapid conversion of liquid caprolactam to solid polycaprolactam at temperatures well below the polyamide melting point, i.e., at temperatures from about 100 to 200° C. Halogenated ketones particularly effective in the anionic polymerization are halogenated alkanones having from 2 to about 20 carbon atoms, preferably from 2 to 10 carbon atoms, in addition to the carbonyl carbon atom ($>C=O$) and halogenated cycloalkanones containing from 3 to about 10 ring carbon atoms in addition to the carbonyl carbon. Representative and particularly preferred halogenated ketones are perhalogenated alkanones and perhalogenated cycloalkanones, e.g., 1,3-dichloro-1,1,3,3-tetrafluoroacetone:

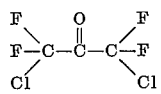

perfluoro-4-heptanone, also known as bis(perfluoro-n-propyl) ketone:

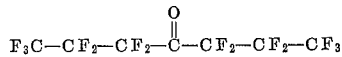

and 2-chloro-2,3,3,4,4-pentafluorocyclobutanone:

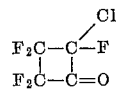

These ketones are effective co-catalysts in concentrations as low as 0.1 mole percent, based on the caprolactam.

In carrying out the process of the invention, caprolactam which is substantially anhydrous, i.e., contains less than 0.1% water, first is heated to a temperature above its melting point (68–69° C.) but below about 225° C. with a small amount of base to prepare the anionic catalyst therein. All or a portion of the caprolactam to be polymerized may be present in this reaction. Suitable bases are those which are sufficiently strong to form an iminium salt of caprolactam, which may be represented simply as:

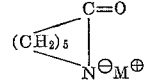

where M represents a metallic cation. Such bases include particularly the alkali metals, e.g., sodium, potassium, and lithium, the alkaline-earth metals, e.g., magnesium, calcium, strontium, and barium, and the compounds of these metals, such as the hydrides, oxides, hydroxides, alkoxides, amides, borohydrides, alkyls, aryls, and the like. The amount of base may vary from about 0.1 to 10 mole percent of the caprolactam, but I generally prefer a base concentration of about 0.2 to 5 mole percent of the lactam.

The time required to effect the preparation of the anionic catalyst will vary from a few minutes to several hours, depending on such factors as the type (strength) of the base used, the base concentration, and the reaction temperature. In general, reaction times of the order of about 1 minute to 2 hours, particularly 10 minutes to 2 hours, are suitable.

To remove any low-molecular-weight material evolved and also to prevent oxidation, it is desirable to bubble nitrogen or another chemically inert gas through the caprolactam melt during the preparation of the basic catalyst. Alternatively, the reaction of the lactam with the base may be conducted under reduced pressure and low-molecular-weight material removed, together with some caprolactam, by distillation.

Following the preparation of the anionic catalyst, the halogenated ketone co-catalyst, e.g., 1,3-dichloro-1,1,3,3-tetrafluoroacetone, perfluoro-4-heptanone, or 2-chloro-2,3,3,4,4-pentafluorocyclobutanone, optionally mixed with additional caprolactam, is added to the lactam containing the anionic catalyst, and the resulting mixture is heated to and maintained at a temperature of from 100 to 200° C., preferably from about 140 to 180° C., until solidification of the mixture occurs. Polymerization to solid polymer is rapid at these temperatures when the halogenated ketone co-catalyst is used in amounts of 0.1 to 1.0 mole percent of the total caprolactam, preferably in amounts of 0.2 to 0.5 mole percent.

The following examples illustrate preferred modes of effecting the process of my invention and their advantages. However, neither these examples nor any of the subsequent examples illustrating other embodiments of the process are to be construed as limiting the invention in any manner.

EXAMPLE 1

A mixture of 16 grams of caprolactam containing less than 0.05% of water and 0.065 gram (0.85 mole percent) of sodium methoxide was charged to a glass test tube, and the tube was placed in a constant-temperature bath at 150° C. Nitrogen was bubbled through the molten mass at a rate of 350 cc. per minute. After 20 minutes at 150° C., during which no polymerization occurred, 0.056 gram (0.2 mole percent) of 1,3-dichloro-1,1,3,3-tetrafluoroacetone was introduced into the catalyst-containing melt as a co-catalyst. Following this addition, the bubbling of nitrogen through the melt was continued for 30 seconds, and then the nitrogen inlet tube was raised to allow the gas to pass over the melt. The tube containing the homogeneous, bubble-free melt was maintained in the constant-temperature bath at 150° C. for a total period of 16.5 minutes following the addition of the co-catalyst, and the polymerizing mass was observed throughout this time. In 11.5 minutes, the mass became sufficiently viscous that the meniscus remained undisturbed when the test tube was turned through an angle of approximately 45°. The first turbidity, indicating the occurrence of crystallization, was seen 14.5 minutes after the addition of the co-catalyst, and solidification of the polymerizing mass to the point where no further change took place in the appearance of the surface occurred 16.5 minutes after the addition. The tube then was taken from the bath, dried, and cooled to room temperature, and the polymer removed for evaluation. In a relative viscosity determination in which preparation of a solution of 0.42 weight percent of the polymer in 90% formic acid at 25.0° C. was attempted, the polymer was found to be insoluble. The amount of low-molecular-weight material in the polymer was determined by extracting 5 grams of 20-mesh polymer granules with 60 ml. of boiling water for 24 hours. The extractable material by this method constituted 10.1 weight percent of the total polymer product.

Anionic polymerization of caprolactam does not occur under the foregoing conditions without the co-catalyst component. A comparative experiment was conducted in which the above-described procedure was repeated except for the omission of the 1,3-dichloro-1,1,3,3-tetrafluoroacetone co-catalyst. Essentially no polymerization occurred after the reaction mixture had been in the 150° C. constant-temperature bath for 8 hours.

EXAMPLES 2–5

The procedure in the runs of these examples (Table I), was the same as that of Example 1, except that the amounts of sodium methoxide catalyst and the amounts of 1,3-dichloro-1,1,3,3-tetrafluoroacetone co-catalyst were those specified in Table I.

In Table I, "no-flow" time refers to the period following addition of the 1,3-dichloro-1,1,3,3-tetrafluoroacetone co-catalyst required for the polymerizing mass to become sufficiently viscous that the meniscus remained undisturbed when the test tube was tilted through an angle of about 45°. Crystallization time refers to the period required for the first turbidity to appear in the mass; solidification or set-up time indicates the period needed for no further change in the appearance of the surface of the polymerizing mass; and total time signifies the entire period during which the polymerizing mass was in the constant-temperature bath following addition of the co-catalyst. $\eta_r$ refers to relative viscosity, and percent E to percent water extractables, both determined as outlined in Example 1.

Table I
ANIONIC POLYMERIZATION OF CAPROLACTAM AT 150° C.

| Example No. | NaOCH$_3$ Catalyst Concn. (mole percent) | 1,3-Dichloro-1,1,3,3-tetrafluoroacetone Co-catalyst Concn. (mole percent) | "No-flow" Time (min.) | Crystn. Time (min.) | Set-up Time (min.) | Total Time (min.) | $\eta_r$ | Percent E |
|---|---|---|---|---|---|---|---|---|
| 2 | 1.5 | 0.2 | 4 | 5.5 | 7.5 | 9.5 | Gel [a] | 6.2 |
| 3 | 1.5 | 0.4 | 4.5 | 6 | 7 | 11.25 | ___do.[a]___ | 5.0 |
| 4 | 2.0 | 0.4 | 3 | ca. 4 | 5 | 10.25 | ___do.[a]___ | 4.7 |
| 5 | 3.0 | 0.4 | 2 | 3 | 5 | 10.5 | ___do.[a]___ | 6.0 |

[a] I.e., 0.42 wt. percent of polymer in 90% formic acid did not dissolve at 25.0° C.

EXAMPLES 6–8

The procedure of Examples 6 to 8 (Table II) was the same as that of the preceding examples, except that the sodium methoxide catalyst concentrations were those specified in Table II and the 1,3-dichloro-1,1,3,3-tetrafluoroacetone co-catalyst was replaced by perfluoro-4-heptanone or 2-chloro-2,3,3,4,4-pentafluorocyclobutanone in the concentrations indicated in Table II. The headings in Table II have the same meaning as those of Table I.

Table II
ANIONIC POLYMERIZATION OF CAPROLACTAM AT 150° C.

| Example No. | NaOMe Catalyst Concn. (mole percent) | Co-catalyst Compound | Co-catalyst Concn. (mole percent) | "No-flow" Time (min.) | Crystn. Time (min.) | Set-up Time (min.) | Total Time (min.) | $\eta_r$ | Percent E |
|---|---|---|---|---|---|---|---|---|---|
| 6 | 1.5 | Perfluoro-4-heptanone | 0.2 | 6.5 | 9 | 11 | 13.25 | Gel [a] | 6.5 |
| 7 | 1.5 | ___do___ | 0.4 | 5.5 | 8.5 | 10 | 12 | ___do.[a]___ | 5.2 |
| 8 | 2.0 | 2-Chloro-2,3,3,4,4-pentafluorocyclobutanone. | 0.4 | 3 | 4.5 | 5.5 | 9.5 | ___do.[a]___ | 6.9 |

[a] I.e., 0.42 wt. percent of the polymer in 90% formic acid did not dissolve at 25.0° C.

The process of the present invention also encompasses conducting the anionic polymerization of caprolactam at low temperatures, i.e., from about 100 to 200° C., in the presence of a combination of one of the halogenated ketone co-catalysts described heretofore with one or more additional compounds which, when used with the ketone, give rates of polymerization higher than those achievable with either the ketones or the additional compound(s) alone. Compounds showing this synergistic effect when used with the ketones in the anionic polymerization include particularly certain substituted ureas. The use of substituted ureas alone as co-catalysts in the anionic polymerization of lactams was known heretofore. However, as is apparent from a comparison of the results in the following Examples 9 to 15 (Table III), these ureas by themselves give low rates of polymerization and low conversions to relatively low-molecular-weight polymer.

The substituted ureas found particularly effective in the present process when used with a halogenated ketone co-catalyst are low-molecular-weight 1,3-dialkyl ureas, particularly 1,3-dimethylurea. By low-molecular-weight 1,3-dialkyl ureas is meant ureas having an alkyl group containing from 1 to 4 carbon atoms on each of the urea nitrogens. The amount of dialkyl-substituted urea is at least 0.1 mole percent, preferably 0.2 to 0.5 mole percent of the total caprolactam. It is desirable that each material, the co-catalyst and urea additive, not exceed about 1.0 mole percent of the caprolactam.

EXAMPLES 9–15

The procedure in Examples 9 to 15 (Table III) was the same as that of the foregoing examples, except that the amount of sodium methoxide catalyst and the types and amounts of co-catalyst component (or components) were those specified in Table III. In each case, addition of the co-catalyst component(s) was followed by observation of the polymerizing mass throughout the period during which it was maintained in the constant-temperature bath at 150° C. The Table III column headings have the same significance as those of Table I.

terms of physical properties indicative of commercial usefulness. My process gives solid polycaprolactam which is tough and impact resistant and hence is suitable as articles of hardware, as protective housings for electrical and electronic fixtures and components, and in like applications. The particular advantages of the present process are most readily apparent when the caprolactam is polymerized in situ to form filled or unfilled shaped articles or coatings and polymer-impregnated fibrous webs.

The process of the invention and its advantages have been described in detail in the foregoing. However, many variations within the spirit and scope of the invention will be apparent to those skilled in the polymer arts. For example, although I have used $\epsilon$-caprolactam to demonstrate the present process, it will be obvious that other lactams, particularly those of $\omega$-amino aliphatic carboxylic acids containing seven or more carbon atoms, would also be rapidly polymerizable. Accordingly, I intend to be limited only by the following claims.

I claim:

1. A process for the rapid polymerization of caprolactam to solid polycaprolactam which comprises heating at a temperature of from 100 to 200° C. a reaction mixture of caprolactam, an anionic catalyst consisting of an iminium salt of caprolactam, and a co-catalyst comprising a perhalogenated ketone selected from the group consisting of perhalogenated alkanones having from 2 to 20 carbon atoms, in addition to the carbon atom of the carbonyl group and perhalogenated cycloalkanones containing from 3 to 10 carbon atoms in the ring, in addition to the carbon atom of the carbonyl group.

2. The process as claimed in claim 1, wherein the co-catalyst comprises 1,3-dichloro-1,1,3,3-tetrafluoroacetone.

3. The process as claimed in claim 1, wherein the co-catalyst comprises perfluoro-4-heptanone.

4. The process as claimed in claim 1, wherein the co-catalyst comprises 2-chloro-2,3,3,4,4-pentafluorocyclobutanone.

*Table III*

ANIONIC POLYMERIZATION OF CAPROLACTAM AT 150° C.

| Example No. | NaOCH$_3$ Catalyst Concn. (mole percent) | Co-catalyst Compound | Co-catalyst Concn. (mole percent) | Additive Compound | Additive Concn. (mole percent) | "No-flow" Time (min.) | Crystn. Time (min.) | Set-up Time (min.) | Total Time (min.) | $\eta_r$ | Percent E |
|---|---|---|---|---|---|---|---|---|---|---|---|
| 9 | 0.85 | 1,3-Dichloro-1,1,3,3-tetrafluoroacetone. | 0.4 | | | 14.5 | 18 | 21.5 | 25 | 7.41 | 7.8 |
| 10 | 0.85 | 1,3-Dimethylurea | 0.4 | | | 36 | 31 | 36 | 42 | 1.29 | 35.1 |
| 11 | 0.85 | 1,3-Dichloro-1,1,3,3-tetrafluoroacetone. | 0.2 | 1,3-Dimethylurea. | 0.2 | 4.5 | 5 | 6 | 10 | 2.5 | 3.2 |
| 12 | 0.85 | Perfluoro-4-heptanone. | 0.2 | | | 11.5 | 13 | 17 | 19 | Gel [a] | 6.1 |
| 13 | 0.85 | ...do... | 0.2 | 1,3-Dimethylurea. | 0.2 | 5 | 5.75 | 7.0 | 8.75 | 2.6 | 6.7 |
| 14 | 1.5 | 1,3-Dichloro-1,1,3,3-tetrafluoroacetone. | 0.4 | | | 4.5 | 6 | 7 | 11.25 | Gel [a] | 5.0 |
| 15 | 1.5 | ...do... | 0.2 | 1,3-Dimethylurea. | 0.2 | 2.5 | 3.75 | 4.5 | 11 | 2.79 | 4.2 |

[a] I.e., 0.42 wt. percent of the polymer in 90% formic acid did not dissolve at 25.0° C.

The data of Table III show clearly the advantages of the halogenated ketone co-catalysts of the present invention over a representative of one of the classes of co-catalysts, substituted ureas, used heretofore in the anionic polymerization of lactams. More importantly, however, the data of this table demonstrate the surprising advantages of using small amounts of one of the perhalogenated ketone co-catalysts and a substituted urea in combination in the anionic polymerization of caprolactam. The polymerization effected in the presence of the combination of halogenated ketone and substituted urea not only is more rapid than would be expected, based on the behavior of the individual additives, but also the polymer produced with the two-component additives is of high quality.

The quality of caprolactam polymer is assessible not only in terms of such properties as molecular weight and content of low-molecular-weight materials but also in 5. The process as claimed in Claim 1, wherein the reaction mixture additionally contains a 1,3-dialkyl urea in which each of the alkyl groups contains from 1 to 4 carbon atoms.

6. The process as claimed in claim 5, wherein the 1,3-dialkyl urea is 1,3-dimethylurea.

7. The process as claimed in claim 1, wherein the reaction mixture is prepared by heating caprolactam at a temperature above its melting point and below 225° C. with a base selected from the group consisting of alkali metals, alkaline earth metals, and the hydrides, oxides, hydroxides, alkoxides, amides, borohydrides, alkyls, and aryls of said metals to produce the said anionic catalyst therein and thereafter adding the said co-catalyst.

8. The process as claimed in claim 7, wherein an inert gas is passed through the molten caprolactam during the reaction with the metallic base while the caprolactam is maintained at a temperature above its melting point and below 225° C.

9. The process as claimed in claim 7, wherein the base is sodium methoxide.

10. A process for the rapid polymerization of caprolactam to solid polycaprolactam which comprises heating at a temperature of from 100 to 200° C. a reaction mixture of caprolactam; an anionic catalyst consisting of an iminium salt of caprolactam; a perhalogenated ketone selected from the group consisting of perhalogenated alkanones containing from 3 to 11 carbon atoms and perhalogenated cycloalkanones containing from 4 to 11 ring carbon atoms; and a 1,3-dialkyl urea containing from 1 to 4 carbon atoms in each of said alkyl groups.

11. A process which comprises preparing a reaction mixture by heating caprolactam at a temperature above its melting point and below 225° C. with from 0.1 to 10 mole percent of a base selected from the group consisting of alkali metals and the hydrides, oxides, hydroxides, alkoxides, amides, borohydrides, alkyls, and aryls of said alkali metals to produce an iminium salt of caprolactam as anionic catalyst therein and subsequently adding from 0.1 to 1.0 mole percent of the caprolactam of a perhalogenated ketone selected from the group consisting of 1,3-dichloro - 1,1,3,3 - tetrafluoroacetone, perfluoro - 4 - heptanone, and 2-chloro-2,3,3,4,4-pentafluorocyclobutanone and from 0.1 to 1.0 mole percent of the caprolactam of 1,3-dimethylurea and thereafter polymerizing the said reaction mixture by heating the mixture at a temperature of from 100 to 200° C.

12. The process as claimed in claim 11, wherein the said perhalogenated ketone and the said 1,3-dimethylurea each is used in an amount of from 0.2 to 0.5 mole percent of the caprolactam.

References Cited in the file of this patent

UNITED STATES PATENTS

| | | |
|---|---|---|
| 2,241,321 | Schlack | May 6, 1941 |
| 3,062,787 | England | Nov. 6, 1962 |
| 3,086,962 | Mottus et al. | Apr. 23, 1963 |